Patented Oct. 7, 1941

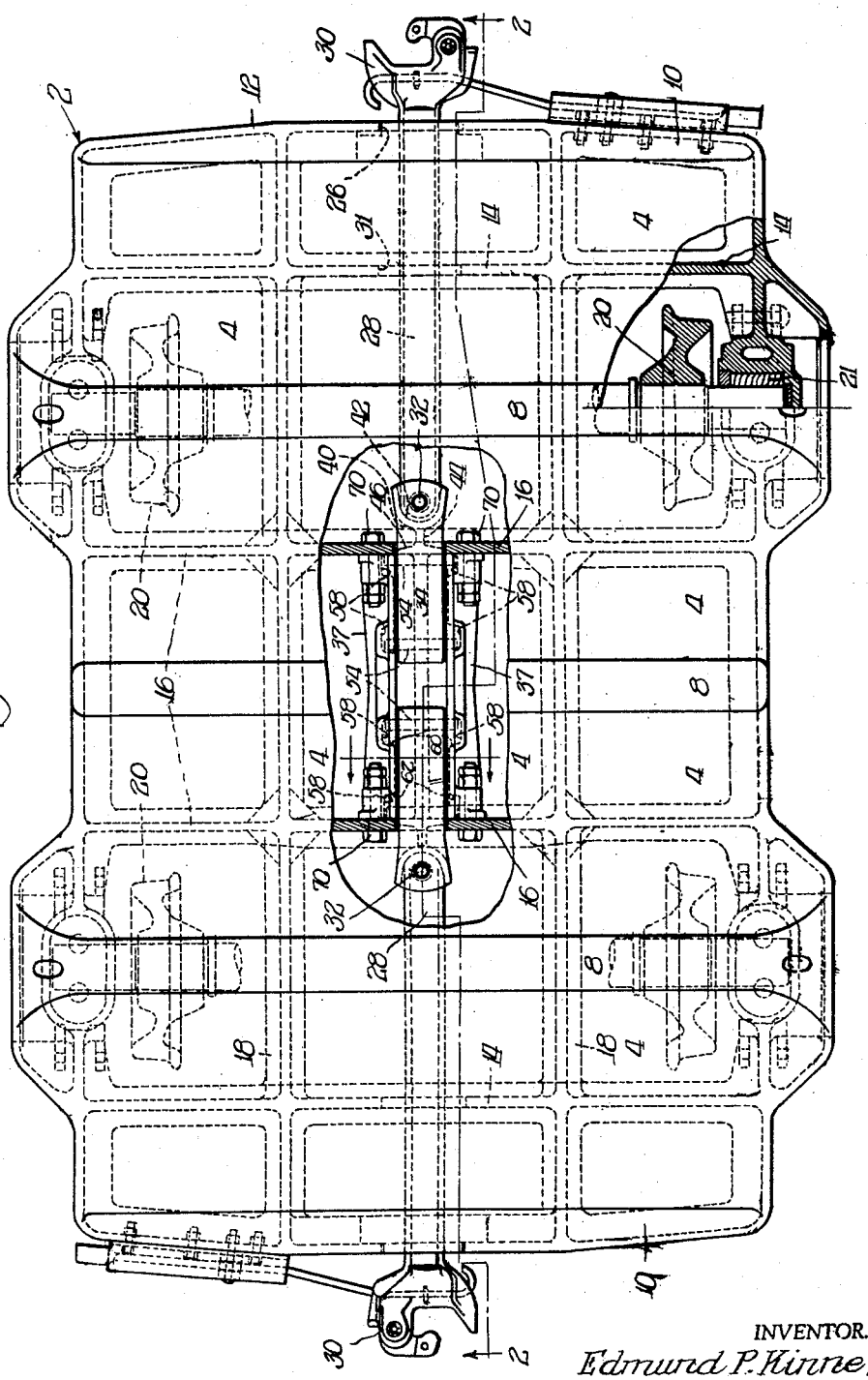

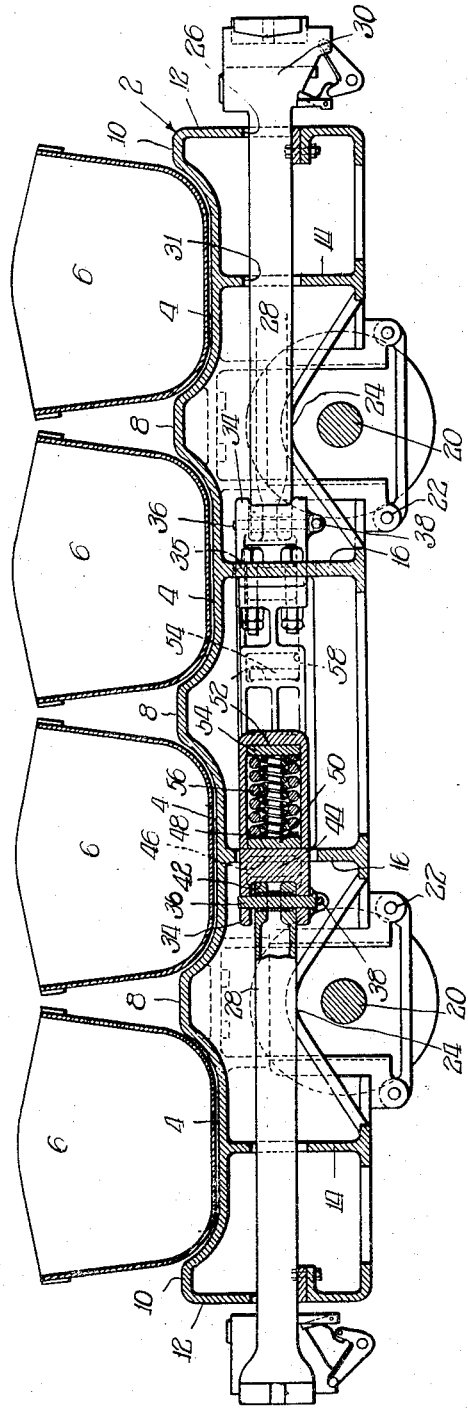

2,257,909

UNITED STATES PATENT OFFICE 2,257,909

DRAFT ARRANGEMENT

Edmund P. Kinne, Alliance, Ohio, assignor to American Steel Foundries, Chicago, Ill., a corporation of New Jersey Application November 2, 1939, Serial No. 302,525

14 Claims. (Cl. 213—50)

My invention relates to a draft arrangement for a special type of car commonly designated a charging box car. Such a car usually is in the form of a single frame casting mounted on a pair of wheel and axial assemblies with a relatively long overhang from each wheel and axle assembly to the end of the car and a relatively short wheel base therebetween. Obviously, such a structure is accompanied by great rigidity and the above-mentioned long overhang has frequently caused derailment. To obviate the derailment troubles long shank couplers have been used which are connected to the truck frame inwardly of the wheel and axle assemblies respectively and such a connection gives added stability.

Due to the before-mentioned rigidity and the heavy loads which such structures commonly support, couplers associated with these cars are subjected to extremely severe usage. In order to reduce this severity of such usage I have designed a novel draft arrangement for such a car, an embodiment of which is hereafter described.

The general object of my invention is to arrange a draft connection for a car of the above general description which will be particularly suitable for a car of short wheel base wherein long shank couplers are connected inwardly of the wheel and axle assemblies.

Another object of my invention is such a draft arrangement which may be readily attached to such cars already in use.

My invention comprehends a draft arrangement which may be readily assembled at the central portion of the frame and as easily dismantled when repair or replacement of parts makes such action desirable.

My invention contemplates a novel form of casting particularly suitable for application to cars of the above description and readily accessible for inspection while in use.

Figure 1 is a top plan view of a conventional type of open hearth charging box car with a portion cut away centrally thereof to show in greater detail my novel draft arrangement therein and a further portion cut away adjacent the end of one wheel and axle assembly to show the manner of connection thereto.

Figure 2 is a side elevation of the car structure shown in Figure 1, partly in section, the section being taken below the top wall of the truck frame and substantially in the planes indicated by the line 2—2 of Figure 1.

Figure 3 is an end elevation of the truck shown in Figures 1 and 2.

Figure 4 is a sectional view through my novel draft arrangement, taken substantially in the transverse vertical plane indicated by the line 4—4 of Figure 1.

Describing the structure in greater detail, the truck frame 2 is an integral casting having the top wall transversely recessed as at 4, 4 to form seats for charging boxes 6, 6 which are normally seated thereacross with the slightly elevated intermediate portions 8, 8 of said top wall spacing said seats and the elevated end portions 10, 10 defining the extremities of the frame. The frame is formed with the transverse end walls 12, 12, transverse ribs 14, 14 adjacent the ends and with other intermediate tranverse ribs 16, 16, spaced longitudinal ribs 18, 18 serving as further reinforcements of the structures which may be generally defined as an inboard shallow box. Spaced wheel and axle assemblies 20, 20 are supported intermediate the transverse ribs 14 and 16 at each end of the car, the outer ends of said wheel and axle assemblies being connected to said frame as at 21 (Figure 1) through the medium of conventional journal boxes 22, 22. The longitudinal ribs 18, 18 are relieved as at 24, 24 to afford space for the wheel and axle assemblies. Each end wall 12 is afforded a central opening at at 26 for insertion of the shank 28 of a long shank coupler 30, said shank extending also through the openings 31 in the transverse wall 14, the inner end of said shank having pivotal connection as at 32 to the yoke 34 by means of the pivot pin 36, said pivot pin being inserted into said connection from the bottom thereof through aligned openings in said shank and yoke and being held in position by the support pin 38. The yoke 34 extends through the opening 35 in the transverse wall 16 and between the novel draft arms in the form of castings 37, 37, being retained in position by the follower blocks more particularly described hereafter. The end of the yoke is formed with a cylindrical wall 40 affording a complementary seat as at 42 for the arcuate end of the coupler shank. Rearwardly of the seat 42 the yoke is formed with the longitudinal rib 44 merging at its opposite end with the transverse wall 46, the opposite face of said wall affording a seat as at 48 (Figure 2) for the outer follower block 50 which may abut thereagainst when said coupler is in draft. The inner end of the wall of the yoke seats as at 52 against the inner follower block 54 and between said follower blocks is the compression spring assembly 56.

The ends of the follower blocks extend into pockets 58, 58 formed at spaced points on my novel draft gear casting. The said pockets 58 afford clearance for the follower blocks to permit limited movement thereof longitudinally of the car structure. In normal position the inner follower blocks are seated as at 52 and the outer follower blocks as at 48 as already described (Figure 2) so that under draft the inner follower block is afforded limited movement in the intermediate pockets 58 as the spring assembly 56 is compressed to a safe maximum when the inner follower block will abut as at 60 (Figure 1) against the edges of the pockets 58. Likewise in buff the outer follower block 50 will be moved away from the seat 48 to seat as at 62, 62 on the edges of the end pockets in the casting 37 in which it is seated, thus limiting the buffing movement.

My novel draft pocket castings 37, 37 extend as already described between the transverse members or ribs 16, 16 and afford on their inner faces pockets 58, 58 for the ends of the follower blocks. It may be noted that each casting is somewhat in the form of an L section (Figure 4) with the lower legs 64, 64 of said L's projecting toward each other and affording seats as at 66, 66 for the yokes 34, 34 housed therebetween. Each casting is afforded a longitudinal flange 68 extending the full length thereof intermediate the top and bottom edges of the casting. Each casting is secured at its opposite ends to the cross member 16, 16 by means of the bolt and nut assemblies 70, 70 and shims may be used if necessary between the ends of said castings and the cross member 16.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a four wheel car, a frame having transverse end members and a plurality of transverse intermediate members, supporting wheel and axle assemblies adjacent the innermost of said transverse members, a plurality of draft castings connected between said innermost transverse members to form a draft gear pocket therewith, each of said castings having an L section with a longitudinal reinforcing rib intermediate its top and bottom edges, the bottom legs of said L's affording seats for enclosed draft means, draft means in said pocket comprising a plurality of yokes secured for limited movement in opposite ends thereof, each of said yokes extending through one of said transverse members, and couplers extending through certain of said end and transverse members for pivotal connection with said yokes inwardly of said wheel and axle assemblies.

2. In a four wheel car having a relatively short wheel base, a frame comprising end members and a plurality of intermediate transverse members, supporting wheel and axle assemblies adjacent the innermost of said transverse members, spaced draft arms supported between said innermost members to form therewith a draft pocket, a plurality of yokes supported for restricted movement in said pocket, each of said yokes having an end projecting through one of said transverse members, and coupler members extending through certain of said transverse members for connection to said yokes, said yoke and coupler connections being adjacent the innermost of said transverse members and inwardly of said wheel and axle assemblies whereby added stability is afforded in draft.

3. In a four wheel car, a frame having transverse end members and a plurality of transverse intermediate members, supporting wheel and axle assemblies adjacent the innermost of said transverse members, a plurality of draft castings connected between the innermost of said transverse members to form a draft gear pocket therewith, each of said castings having an L section with a longitudinal reinforcing rib intermediate its top and bottom edges, the bottom legs of said L's affording seats for enclosed draft means, draft means in said pocket comprising a plurality of yokes secured for limited movement in opposite ends thereof, each of said yokes extending through one of said transverse members, and couplers extending through certain of said end and transverse members for pivotal connection with said yokes intermediate said wheel and axle assemblies.

4. In a four wheel car, a frame having transverse end members and a plurality of transverse intermediate members, supporting wheel and axle assemblies adjacent the innermost of said transverse members, a plurality of draft castings connected between the innermost of said transverse members to form a draft gear pocket therewith, each of said castings having an L section with a longitudinal reinforcing rib intermediate its top and bottom edges, the bottom legs of said L's affording seats for enclosed draft means, and draft means in said pocket comprising a plurality of yokes secured for limited movement in opposite ends thereof, each of said yokes extending through one of said transverse members and affording pivotal connection to an associated coupler inwardly of the adjacent wheel and axle assemblies.

5. In a four wheel railway car of relatively short wheel base, a frame comprising end members and a plurality of intermediate transverse members, spaced wheel and axle assemblies, draft arms extending between the innermost of said transverse members to form therewith a draft pocket, yokes having their inner ends secured in said pocket and their outer ends extending through said innermost members, and couplers connected to said yokes at pivot points intermediate said wheel and axle assemblies, each of said draft arms affording stop means for a plurality of follower blocks associated with each of said yokes as said yokes move in one direction and stop means for one of said follower blocks as said yokes move in the opposite direction.

6. In a four wheel railway car of relatively short wheel base, a frame comprising end members and a plurality of intermediate transverse members, spaced wheel and axle assemblies, draft arms extending between the innermost of said transverse members to form therewith a draft pocket, yokes having their inner ends secured in said pocket and their outer ends extending through said innermost transverse members, and couplers connected to said yokes at spaced pivot points intermediate said wheel and axle assemblies, each of said draft arms affording a plurality of stop means for a follower block associated with each of said yokes and a single stop for a second follower block associated with each of said yokes.

7. In a four wheel car having a relatively short wheel base, a frame comprising end members and a plurality of intermediate transverse members, supporting wheel and axle assemblies adjacent the innermost of said transverse members, spaced draft arms supported between said innermost members to form therewith a draft pocket, and a plurality of yokes supported for restricted movement in said pocket, each of said yokes having an end projecting through one of said transverse members and coupler members extending through certain of said transverse members for connection to said yokes at spaced points intermediate said wheel and axle assemblies.

8. In a four wheel car, a frame comprising transverse end members and a plurality of transverse intermediate members, supporting wheel and axle assemblies, draft castings secured to adjacent transverse members to form a draft pocket centrally of said frame, a plurality of yokes secured for limited movement therein and extending through certain of said transverse members, each of said castings having a plurality of pockets affording stop means for a plurality of follower blocks associated with each yoke, at least one of said follower blocks having abutment against said stop means in both draft and buffing action, and coupler means pivotally connected to said yokes at opposite ends of the car, said pivotal connections being at spaced points intermediate said wheel and axle assemblies.

9. In a four wheel car, a frame comprising transverse end members and a plurality of transverse intermediate members, supporting wheel and axle assemblies, draft castings secured to adjacent transverse members to form a draft pocket centrally of said frame, a plurality of yokes secured for limited movement therein and extending through certain of said transverse members, each of said castings having a plurality of pockets affording stop means for a plurality of follower blocks associated with each yoke, and coupler means for each end of the car pivotally connected to said yokes respectively at spaced points intermediate said wheel and axle assembly.

10. In a four wheel railway car of relatively short wheel base, a frame comprising end members and a plurality of intermediate transverse members, spaced wheel and axle assemblies, draft arms extending between the innermost of said transverse members to form therewith a draft pocket, yokes having their inner ends secured in said pocket and their outer ends extending through said innermost members, and couplers pivotally connected to said yokes at spaced points intermediate each wheel and axle assembly and the adjacent innermost transverse member and extending outwardly of said frame through certain of said transverse and end members.

11. In a four wheel railway car of relatively short wheel base, a frame comprising end members and a plurality of intermediate transverse members, spaced wheel and axle assemblies, draft arms extending between the innermost of said transverse members to form therewith a draft pocket, yokes having their inner ends secured in said pocket and their outer ends extending through the innermost of said transverse members at opposite ends of the car, and couplers pivotally connected to said yokes at opposite ends of the car between each wheel and axle assembly and the adjacent innermost member, each of said draft arms affording a plurality of stop means for follower blocks associated with each of said yokes.

12. In a four wheel car, a truck frame, supporting wheel and axle assemblies, transverse members on said frame intermediate said assemblies, draft castings secured between said transverse members to form a draft pocket, and draft means secured in said pocket comprising a plurality of yokes, resilient means within each yoke, and stop means therefor, said yokes extending through said transverse members respectively for pivotal connection to associated couplers at points intermediate said wheel and axle assemblies, thereby affording increased stability in draft or buff.

13. In a four wheel car, a frame comprising transverse end members and a plurality of transverse intermediate members, supporting wheel and axle assemblies, draft castings secured to adjacent transverse members to form a draft pocket centrally of said frame, a plurality of yokes secured for limited movement therein and extending through certain of said transverse members, and couplers having elongated shanks extending through said end members and certain of said transverse members for pivotal connection to said yokes at spaced points intermediate said assemblies.

14. In a four wheel car, a frame comprising transverse end members and a plurality of transverse intermediate members, supporting wheel and axle assemblies, draft castings secured to adjacent transverse members to form a draft pocket centrally of said frame, a plurality of yokes secured for limited movement therein and extending through certain of said transverse members, and couplers pivotally connected to said yokes respectively at points intermediate said wheel and axle assemblies.

EDMUND P. KINNE.